3,280,196
BENZHYDRYL-DIHALOALKANE ETHERS
Frederick A. E. Schilling, Nutley, N.J., assignor to S. B. Penick & Company, New York, N.Y., a corporation of Delaware
No Drawing. Filed May 25, 1962, Ser. No. 197,593
5 Claims. (Cl. 260—611)

This invention relates to certain useful benzhydryl heterocyclic ethers and more particularly to a novel process for their synthesis from certain novel 2-benzhydryl-dihaloalkane ethers.

Pyrrolidino- and piperidino benzhydryl ethers and their salts are described respectively in U.S. Patents 2,830,997 to Lunsford and 2,974,146 to Biel where the former are noted as possessing antihistaminic properties and the latter are stated to have sedative qualities. Such compounds can be represented by the formula:

(I)
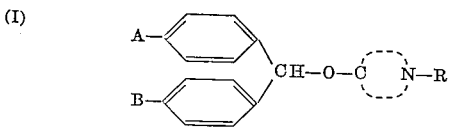

where

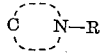

represents a nitrogen-containing heterocyclic ring such as pyrrolidyl and piperidyl and where the R may be hydrogen, alkyl, cycloalkyl and aralkyl; A and B represent hydrogen or nuclear substituents such as halo, lower alkyl and alkoxy.

These compounds have been prepared according to the cited patents by the reaction of the appropriate benzhydryl halide with the N-substituted heterocyclic alcohol under anhydrous conditons. The overall yields, including the preparation of the proper heterocyclic alcohol by ketone reduction after a Dieckmann cyclization are not very satisfactory.

It is an object of this invention to provide a novel process for preparing benzhydryl-heterocyclic ethers. The ethers are obtained in this novel process in good yields and from relatively inexpensive starting materials.

It is a further object of this invention to provide useful intermediates in the class of benzhydryl ethers of dihaloalkanols which upon cyclization with amines will provide these benzhydryl-heterocyclic ethers.

This invention in its process aspects comprises the concept of reacting dihalo alkanols having the formula:

(II)
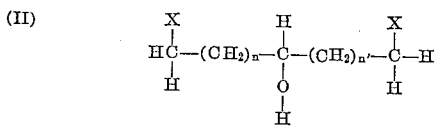

in which X is a halogen heavier than fluoride, $n$ and $n'$ are zero (0) or one (1) and the sum of $n$ and $n'$ is 1 or 2; with benzhydryl halides to form novel benzhydryloxy dihaloalkanes; and the subsequent cyclization of these novel ethers with primary amines to form the desired heterocyclic ethers. (I) The reactions involved can be represented by the following sequence of reactions.

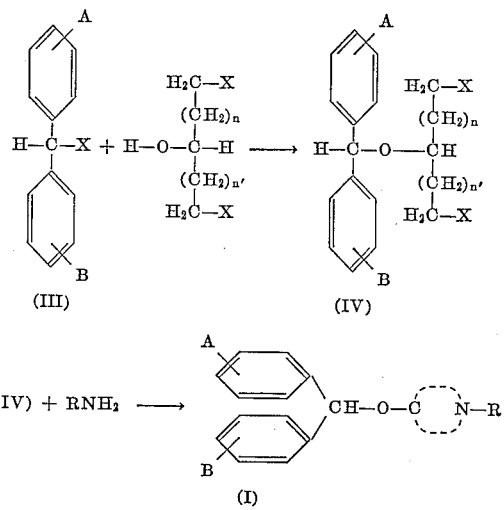

The dihaloalkanol is preferably a dichloralkanol but the dibromo and diiodo alkanols are fully equivalent and will yield the analogous benzhydryl ethers of dihaloalkanes. These latter novel compounds upon cyclization with a primary amine will yield the same benzhydryl heterocyclic ethers.

The term "benzhydryl" as used in this specification includes the substituted and unsubstituted benzhydryl radicals. In the case of the substituted benzhydryl radicals, ring substituents such as alkyl, halo, alkoxy and the like may be found on one or more ring carbons in one or both aromatic rings of the benzhydryl radicals.

The starting benzhydryl halide may be the chloride, bromide, or iodide. The chloro compound is preferred for economy but on occasion it is expedient to use the more reactive benzhydryl bromides or iodides.

Representative dihaloalkanols useful in this invention include the 1,4-dichlorobutanol-2 (V) B.P. 99–100° centigrade/21 mm. 1,4-dibromobutanol-2 (VI) B.P. 114–115° centigrade/13 mm.

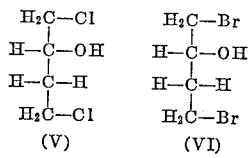

for preparing 3 benzhydryloxy pyrrolidines having the formula:

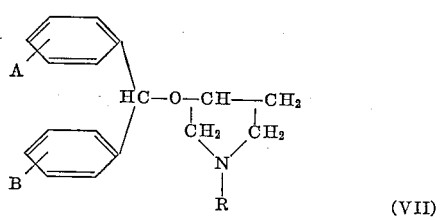

The 1-5-dihalopentanol-2

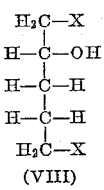
(VIII)

Useful in preparing 3-benzhydryloxy piperidines of the formula:

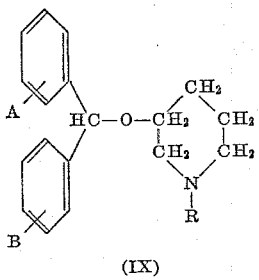
(IX)

The 1,5-dihalo pentanol-3

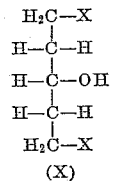
(X)

useful in preparing the 4-benzyhydryloxy-piperidines of the formula:

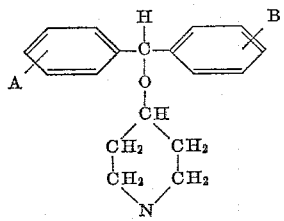

The condensation reaction (III) between the benzhydryl halide and the dihaloalkanol is best carried out in an inert, highly polar solvent or acid acceptor solvent. Among solvents inert to this reaction are dimethylformamide and dimethylsulfoxide.

The cyclization reaction (IV) is preferably carried out in solution, the lower alcohols and esters being preferred solvents.

The compositional aspects of this invention include the novel benzhydryl ethers of the 4 and 5 carbon dihaloalkanols. Among these, all of which are novel, are the unsubstituted and substituted 2-(benzhydryloxy)1,4-dichloro and dibromo-butanes. The benzhydryloxy radicals may bear substituents on one or both of the benzene rings making up the benzhydryl moiety. Among such moieties are benzhydryl; the 4-chlorobenzhydryl; the 4-methylbenzhydryl; the 4,4'-dimethoxybenzhydryl; 4-bromobenzhydryl; the 3,4-dimethylbenzhydryl; 3,3',4,4'-tetramethylbenzhydryl ethers of 1,4-dihalobutanol-2. In addition the novel 1,5-dihalopentanol-2 ethers of the same benzhydryl moieties are included as are their 1,5-dihalopentanol-3 ethers.

This invention will be further disclosed in the examples which set forth directions to those skilled in the art for the practice of the processes and the preparation of the novel class of compounds of this invention.

EXAMPLE 1

*2-(p-chloro-benzhydryloxy)-1,4-dichlorobutane*

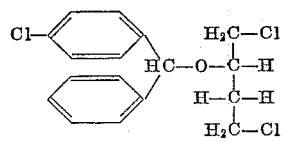

Reflux 0.25 mol of 1,4-dichlorobutanol with 0.27 mol (10% excess) of p-chlorobenzhydryl chloride in a liter of dimethyl formamide for about three hours. Cool the mixture, wash with water, neutralize with sodium hydroxide solution and distill off the dimethyl formamide at reduced pressures. Purify the oily crude 2-(p-chlorobenzhydryloxy)-1,4-dichlorobutane and purify by vacuum distillation, B.P. 165° centigrade/0.18 mm.; $n_D^{25}=1.5722$.

EXAMPLE 2

*2-benzhydryloxy-1,4-dichlorobutane*

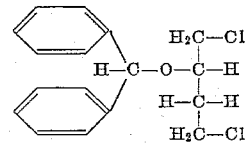

Reflux 1,4-dichlorobutanol-2 with a 10% molar excess of benzhydryl chloride in dimethyl formamide overnight. Neutralize the mixture with KOH and wash the reaction mixture with water. Remove the reaction medium by vacuum distillation. Dissolve the residue in benzene, filter and then distill off the benzene. Purify the 2-benzhydryloxy-1,4-dichlorobutane by vacuum distillation, B.P. 150–152°/0.10 mm.; $n_D^{25}=1.5645$.

EXAMPLE 3

*2-benzhydryloxy-1,5-dichloropentane*

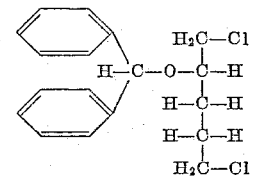

Reflux 0.2 mol of dichloropentanol-2 with 0.22 mol of benzhydrylchloride in dimethylformamide for 4 hours. Cool and extract the mixture with chloroform. Wash the extracts with water until neutral, then remove the solvent to yield an oily residue. Vacuum distill the dimethylformamide and purify the crude 2-benzhydryloxy-1,5-dichloropentane by vacuum distillation, B.P. 143° centigrade/.04 mm.; $n_D^{20}=1.5740$.

*Preparation of 3,4-dimethylbenzhydryl chloride*

Scheme

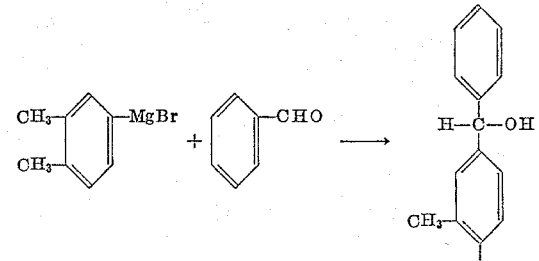

Prepare a Grignard reagent from 4-bromo-o-xylene. To this add an equivalent amount of benzaldehyde diluted with an equal volume of dry ether. Add the benzaldehyde-ether mixture slowly in order to maintain a reasonable reflux rate. When the addition is completed, add to this solution an excess of concentrated hydrochloric acid which has been diluted with three volumes of water. Separate the ether layer and wash the aqueous layer three times with ether. Combine the ether extracts and remove the ether by distillation to obtain crude 3,4-dimethylbenzhydrol. Crystallize the crude, viscous liquid from petroleum ether by cooling. The recrystallized product has a melting point 63–63.6° centigrade.

Reflux the 3,4-dimethylbenzhydrol with 2 equivalents of thionyl chloride for three hours. Remove the excess of thionyl chloride by vacuum distillation and recover the 3,4 - dimethylbenzhydryl chloride B.P. 110–114° centigrade/0.05 mm.

EXAMPLE 4

*2-(3,4-dimethylbenzhydryloxy)1,4-dichlorobutane*

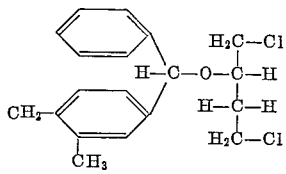

Reflux 0.22 mol of 3,4 - dimethylbenzhydryl chloride with 0.2 mol of 1,4-dichlorobutanol-2 in dimethylformamide for 4 hours. Cool and suspend the reaction mixture in benzene. Filter the benzene suspension to remove the insolubles and wash the benzene solution with water until neutral. Distill off the benzene and dimethylformamide under vacuum to recover the crude 2-(3,4-dimethylbenzhydryloxy)-1,4 dichlorobutane. Purify the product by vacuum distillation, B.P. 160° centigrade/0.25 mm.; $n_D^{20} = 1.5650$.

*Preparation of 3,3',4,4'-tetramethyl benzhydrylchloride*
Scheme:

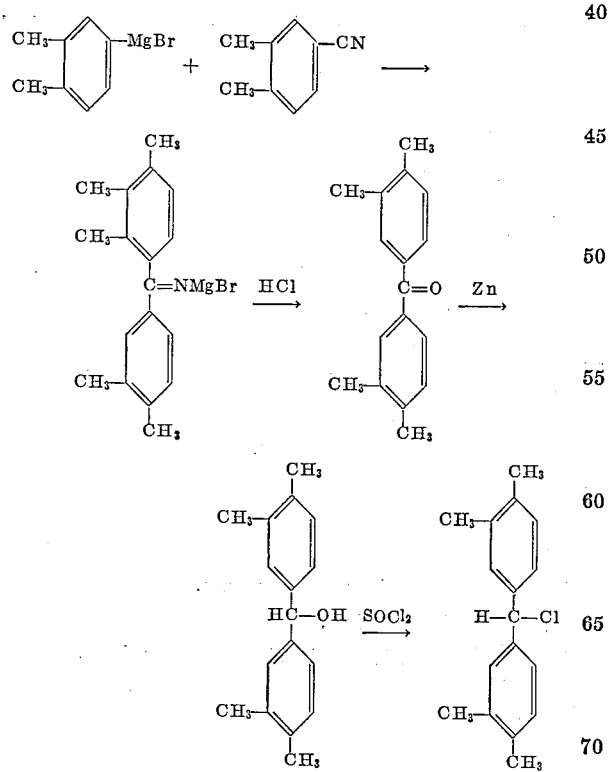

Prepare the Grignard reagent of 4-bromo-o-xylene and react this with 3,4-dimethylbenzonitrile in the presence of dry ether. Remove the ether and replace with dry benzene. Maintain the temperature at about 80° centigrade, then cool to room temperature and add diluted hydrochloric acid until the aqueous layer has a pH of 2–3. Filter off the solids and separate the water and benzene layers. The benzene layer is then reduced in volume to yield a solid product. This is combined with the filter cake. This material is the crude imino magnesium bromide of 3,3',4,4'-tetramethylbenzophenone, melting point of 210–240° centigrade.

The imino compound is converted to 3,3',4,4'-tetramethylbenzophenone by refluxing 24 hour in 1 to 1 hydrochloric acid or by refluxing with 1 normal sodium hydroxide for 2½ hours. The purified 3,3',4,4'-tetramethylbenzophenone from either hydrolysis process melts at 143–144° centigrade.

The tetramethylbenzophenone is converted to 3,3',4,4'-tetramethylbenzhydrol by mixing with an excess of sodium hydroxide in alcoholic solution, and then adding an equivalent amount of powdered zinc slowly to the reaction mixture. The reaction mixture is refluxed for 2½ hours and filtered to remove the insolubles. The filtered reaction mixture is then run into a slight excess of hydrochloric acid and diluted with cold water. Filter to obtain a product melting at 92–93° centigrade. Reflux the 3,3',4,4' - tetramethylbenzhydrol with 2 equivalents of thionyl chloride for 1 hour. Distill off the excess thionyl chloride and recover the 3,3',4,4'-tetramethylbenzhydryl chloride.

EXAMPLE 5

*2-(3,3',4,4'-tetramethylbenzhydryl)-1,4-dichlorobutane*

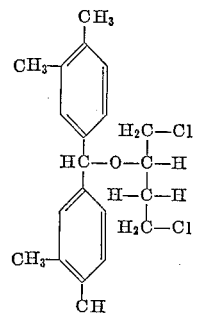

Reflux 0.2 mol of 3,3',4,4'-tetramethylbenzhydryl chloride with 0.18 mol of 1,4 dichlorobutane-2 and dimethylformamide for three hours. Cool and extract with chloroform. Wash the filtered extract with water until neutral. Strip the chloroform. Dissolve the thick oily residue in benzene, cool, filter off and discard the solids. Distill off the benzene and vacuum distill the product, 2-(3,3',4,4'-tetramethylbenzhydryl)1,4-dichlorobutane, B. P. 145–146° centigrade 0.1 mm.; $n_D^{20}=1.5622$.

Another aspect of this invention is the preparation of the N-substituted-heterocyclic ethers of benzhydrol by ring closure of the dihaloalkane ethers of benzhydrol set forth above. This ring closure is effected by reacting the ether with a primary amine under conditions conducive to the elimination of the haloacid from the reaction medium.

EXAMPLE 6

*1-methyl-3-p-chlorobenzhydryloxy pyrrolidine*

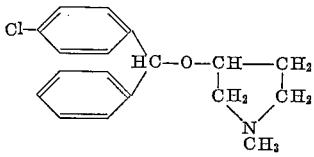

Prepare 2-(p-chlorobenzhydryloxy)-1,4 dichlorbutane according to the procedure of Example 1 and react it with an excess of methylamine dissolved in cold ethanol (5° centigrade) in a pressure vessel. Heat the reaction mixture to a temperature of 100–150° centigrade for 1-3 hours to insure completion of the ring closure reaction. Cool and acidify the reaction mixture with aqueous hydrochloric acid. Extract with benzene to remove unreacted materials and discard the extracts. Basify the aqueous residue with sodium carbonate and extract with chloroform. Distill off the chloroform and the methylamine and purify the residue by vacuum distillation. The resultant liquid corresponds to the material reported in U.S. Patent 2,830,997, Example 10 (B.P. 160–162° centigrade/0.125 mm.; $n_D^{25}$=1.5650).

EXAMPLE 7

*1-isopropyl-3-p-chlorobenzhydryloxy pyrrolidine*

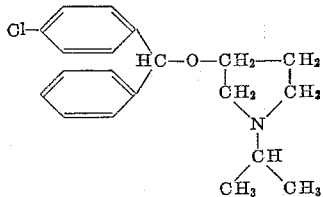

A 20% molar excess of isopropylamine is fed into a pressure vessel containing 2-(p-chlorobenzhydryloxy)-1,4-dichlorobutane prepared according to Example 1 supra. The temperature during the addition is maintained in the range 70–120° centigrade. Upon completion of the addition the temperature is raised to 130° centigrade and maintained there for 2 hours after which time the reaction mixture is cooled. The material is acidified and extracted with benzene; the residue is basified, extracted with chloroform and the chloroform extract concentrated by distillation. The concentrate is vacuum distilled to yield 1-isopropyl-3-p-chlorobenzhydryloxy pyrrolidine. This material and the hydrochloride which is prepared by treating the base with ethereal hydrogen chloride acid and crystallized from a butanone-ether mixture corresponds to the material of Example 13 in U.S. 2,830,997. (Base: B.P. 158–159° centigrade/0.15 mm.; $n_D^{25}$=1.5570; hydrochloride salt: M.P. 147–149° centigrade.)

EXAMPLE 8

*1-isopropyl-3-benzhydryloxy pyrrolidine*

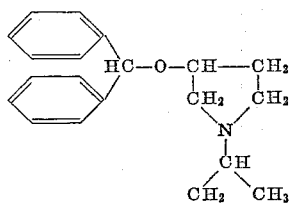

Slowly add a 10% excess of isopropylamine to 2-(benzhydryloxy)-1,4 dichlorobutane (prepared according to Example 2 supra) in a pressure vessel. Maintain the temperature in the range 70–120° centigrade during the addition, then maintain the mixture at 130° for 2 hours. Purify according to the procedure in Example 7 to recover 1-isopropyl-3-benzhydryloxy pyrrolidine. This material has a B.P. of 137–140/0.2 mm.; $n_D^{25}$=1.5505. Its hydrochloride, prepared as above, melts at 141–144° centigrade. (Cf. U.S. Patent 2,830,977, Example 4.)

EXAMPLE 9

*1-methyl-3-benzhydryloxy piperidine*

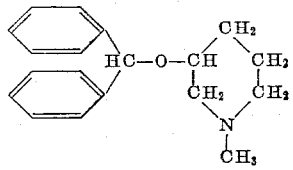

Charge a pressure vessel with 2-benzhydryloxy-1,5 dichloropentane (prepare according to Example 3 supra) and an excess of methylamine dissolved in cold ethanol (5° centigrade). Seal the vessel and maintain the mixture at 130° for 4 hours. Cool the mixture, acidify with concentrated hydrochloric acid and distill off the alcohol under mild vacuum. Extract the aqueous acidic slurry with benzene, make the aqueous layer alkaline with sodium hydroxide and extract with chloroform. Concentrate the chloroform extract by distillation and then vacuum distill 1-methyl-3 benzhydryloxy piperidine. (B.P. 125–126/0.08 mm.; $n_D^{20}$=1.5547. Cf. U.S. Patent 2,974,146, Example 3.) This material is then converted to the methobromide by treating with methylbromide. The methobromide has a melting point 170–171° centigrade.

This specification and the appended examples set forth representative procedures and compounds and are not to be construed as the limits of the scope of this invention. The compound and procedures in the appended claims and their equivalents are the invention in its full scope.

I claim:

1. Benzhydryl ethers of dihaloalkanes of the formula

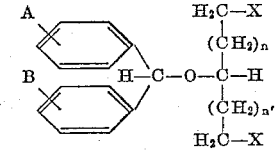

where X is halogen heavier than fluorine and $n$ and $n'$ are zero (0) or one (1); and where $n$ and $n'$ have a combined sum of less than 3; and A and B are each selected from the group consisting of hydrogen, lower alkyl, and halogen.

2. A compound of claim 1 wherein the sum of $n$ and $n'$ is 1.
3. A compound of claim 1 wherein the sum of $n$ and $n'$ is 2.
4. The benzhydryl ether of 1,4-dichlorobutanol-2.
5. The benzhydryl ether of 1,5-dichloropentanol-2.

References Cited by the Examiner
UNITED STATES PATENTS 2,567,350  9/1951  Rieveschl _____ 260—611

FOREIGN PATENTS 516,943  9/1955  Canada.

OTHER REFERENCES

Elderfield: Heterocyclic Compounds, vol. I, pages 642–643 (1950), published by John Wiley & Sons, Inc.

LEON ZITVER, *Primary Examiner.*

N. S. RIZZO, *Examiner.*

R. L. PRICE, B. HELFIN, *Assistant Examiners.*